(12) United States Patent
Kreutzer, Jr.

(10) Patent No.: US 6,848,392 B1
(45) Date of Patent: Feb. 1, 2005

(54) INSECT TERMINATING PET DISH

(76) Inventor: Henry J. Kreutzer, Jr., 2292 West Ave. 134th, San Leandro, CA (US) 94577

(*) Notice: Subject to any disclaimer, the term of this patent is extended or adjusted under 35 U.S.C. 154(b) by 0 days.

(21) Appl. No.: 10/338,317

(22) Filed: Jan. 8, 2003

Related U.S. Application Data

(63) Continuation-in-part of application No. 09/944,006, filed on Aug. 31, 2001, now abandoned.

(51) Int. Cl.[7] .............................................. A01K 5/01
(52) U.S. Cl. ...................................................... 119/61
(58) Field of Search ........................... 43/112, 107, 98; 119/61, 51.5, 73

(56) References Cited

U.S. PATENT DOCUMENTS

| | | | |
|---|---|---|---|
| 1,441,606 A | * 1/1923 | Smith | 43/112 |
| 3,441,003 A | 4/1969 | Du Mond et al. | |
| 4,144,668 A | 3/1979 | Darncharnjitt | |
| 4,165,577 A | 8/1979 | Shanahan | |
| 4,827,874 A | 5/1989 | Manhan | |
| 4,949,500 A | 8/1990 | Jefferys | |
| 4,953,506 A | 9/1990 | Sanders | |
| 5,069,167 A | * 12/1991 | Kasselman | 119/61 |
| 5,109,800 A | 5/1992 | Williams | |
| 5,113,798 A | 5/1992 | Rera | |
| 5,125,363 A | 6/1992 | McGaha | |
| 5,205,242 A | 4/1993 | Kasselman | |
| 5,253,609 A | * 10/1993 | Partelow et al. | 119/61 |
| D342,352 S | 12/1993 | Embry | |
| 5,557,879 A | 9/1996 | Ott | |
| 5,619,952 A | 4/1997 | Walker | |
| 5,709,168 A | 1/1998 | Walker | |
| 5,730,083 A | * 3/1998 | Walker | 83/699.41 |
| 5,732,503 A | 3/1998 | Cheng | |
| 5,787,839 A | 8/1998 | Magnant et al. | |
| 5,794,564 A | * 8/1998 | Paro | 119/61 |
| 5,842,305 A | 12/1998 | Liao | |
| 6,018,904 A | 2/2000 | Lee | |
| 6,056,428 A | 5/2000 | Devoino et al. | |
| 6,125,790 A | 10/2000 | Breedwell | |
| 6,167,840 B1 | 1/2001 | White et al. | |
| 6,314,911 B1 | 11/2001 | Kaytovich | |
| 6,581,541 B2 | * 6/2003 | Hollinger | 119/61 |

* cited by examiner

*Primary Examiner*—Peter M. Poon
*Assistant Examiner*—Bethany L. Griles

(57) ABSTRACT

An insect terminating pet food dish apparatus includes a base, a bowl or rest member, and a support supporting the bowl or rest member above the base. An insect terminating assembly on the support includes at least a pair of electrically conductive coils extended about the support member in a substantially uniformly spaced relationship to each other. A first coil is relatively positively charged and a second coil is relatively negatively charged such that an insect simultaneously contacting both coils closes a circuit that includes the insect's body. The terminating assembly also includes a power source for producing a potential difference between the pair of coils. In one embodiment, the support is substantially cylindrical, and the coils are substantially helical on the outer surface of the support and each of the helical coils extends, from a lower position to an upper position on the support.

12 Claims, 8 Drawing Sheets

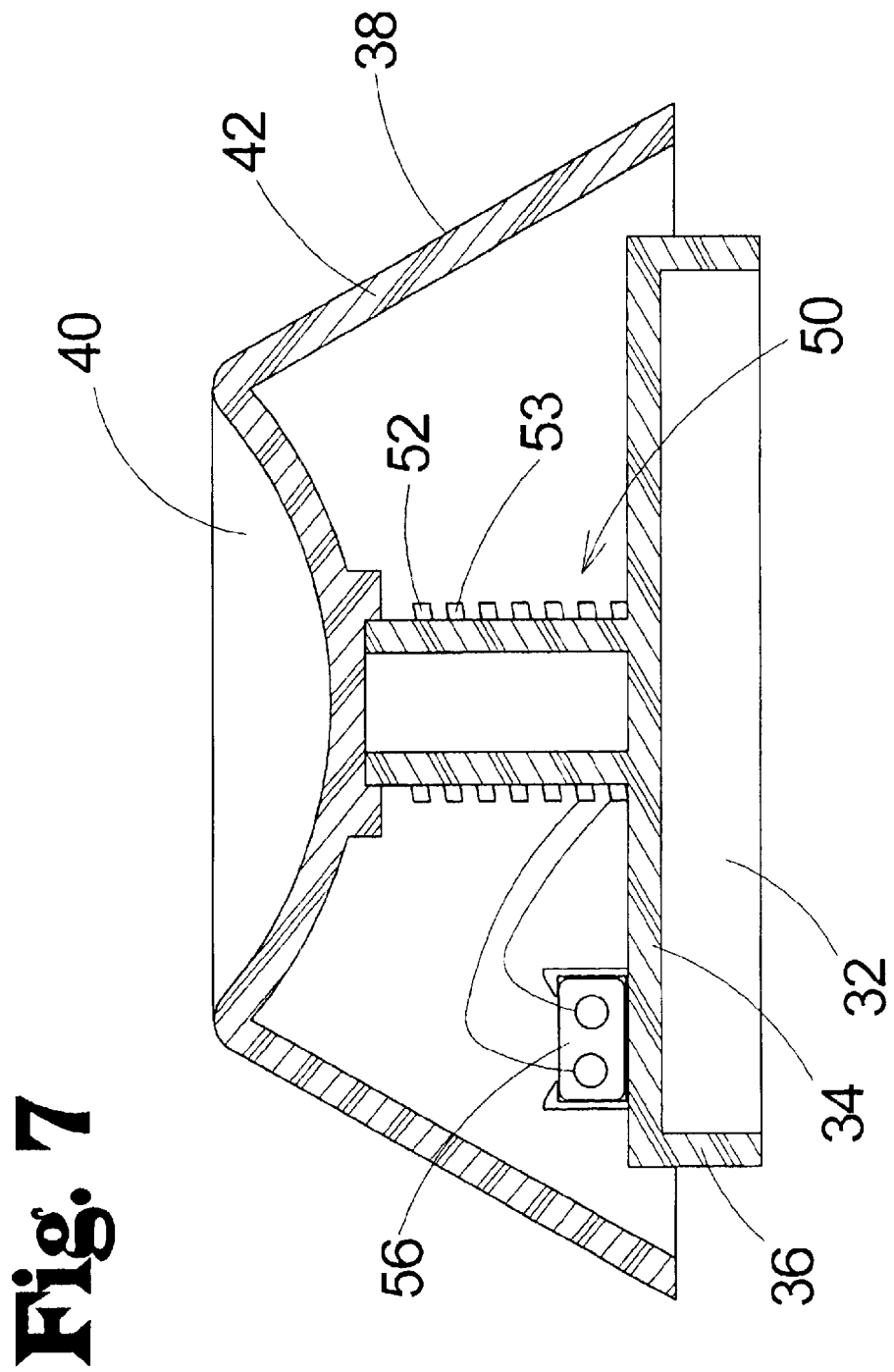

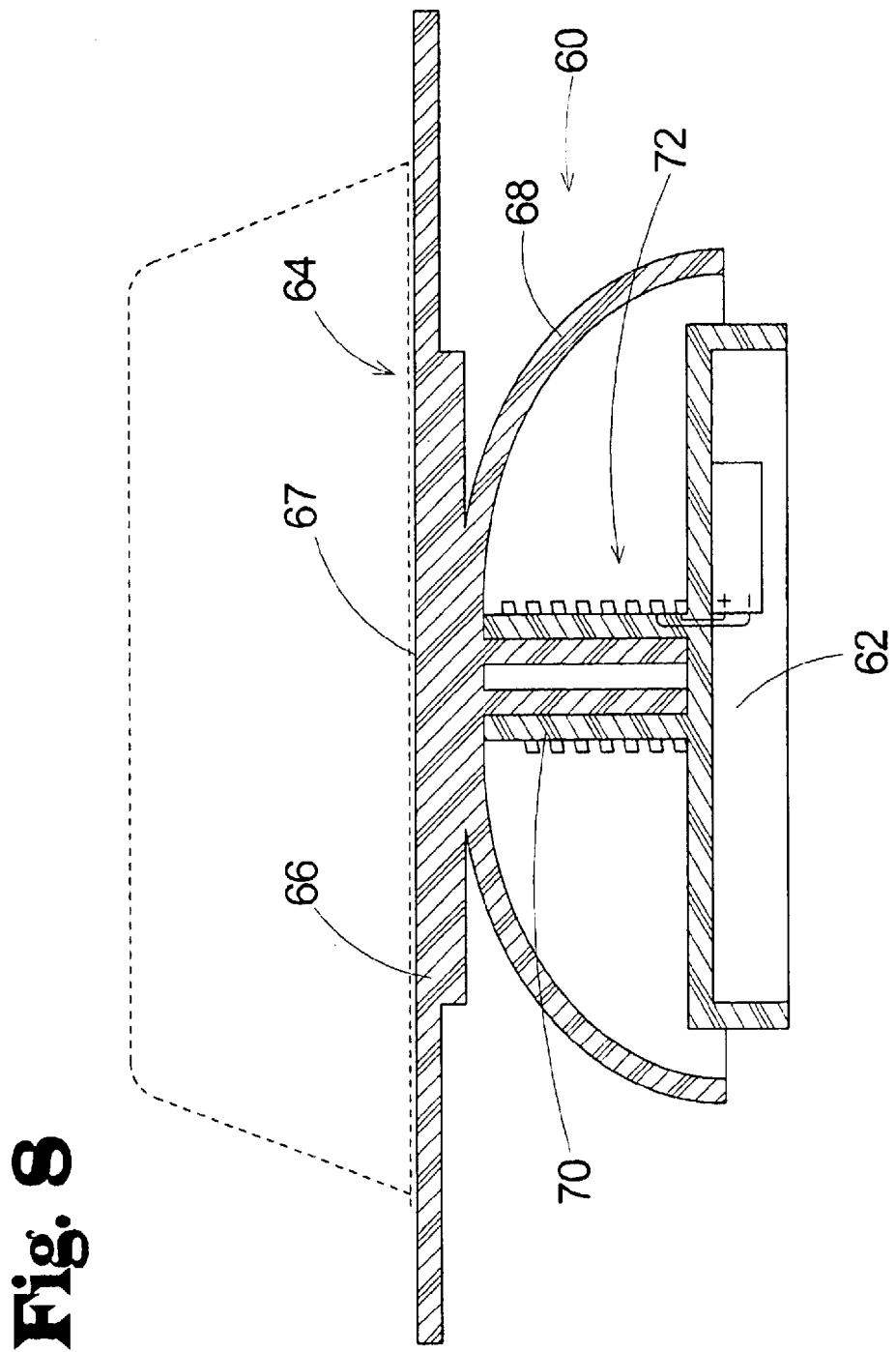

INSECT TERMINATING PET DISH

REFERENCE TO RELATED APPLICATION

This application is a continuation-in-part of U.S. patent application Ser. No. 09/944,006, filed Aug. 31, 2001 now abandoned.

BACKGROUND OF THE INVENTION

1. Field of the Invention

The present invention relates to insect terminators and more particularly pertains to a new insect terminating pet dish for providing a pet food/water dish that would be resistant to insects.

2. Description of the Prior Art

The use of insect terminators is known in the prior art. More specifically, insect terminators heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,732,503; 4,949,500; 4,827,874; 4,165,577; 4,144,668; and Des. 342,352.

While these devices fulfill their respective, particular objectives and requirements, the aforementioned patents do not disclose a new insect terminating pet dish. The inventive device includes a base assembly including a bowl-shaped base member being adapted to rest upon a ground; and also includes a bowl member being fastened with a fastener upon the bowl-shaped base member; and further includes an insect terminating assembly being attached to the bowl-shaped base member.

In these respects, the insect terminating pet dish according to the present invention substantially departs from the conventional concepts and designs of the prior art, and in so doing provides an apparatus primarily developed for the purpose of providing a pet food/water dish that would be resistant to insects.

SUMMARY OF THE INVENTION

In view of the foregoing disadvantages inherent in the known types of insect terminators now present in the prior art, the present invention provides a new insect terminating pet dish construction wherein the same can be utilized for providing a pet food/water dish that would be resistant to insects.

The general purpose of the present invention, which will be described subsequently in greater detail, is to provide a new insect terminating pet dish which has many of the advantages of the insect terminators mentioned heretofore and many novel features that result in a new insect terminating pet dish which is not anticipated, rendered obvious, suggested, or even implied by any of the prior art insect terminators, either alone or in any combination thereof.

To attain this, the present invention generally comprises a base, a bowl or rest member, and a support supporting the bowl or rest member above the base. An insect terminating assembly on the support includes at least a pair of electrically conductive coils extended about the support member in a substantially uniformly spaced relationship to each other. A first coil is relatively positively charged and a second coil is relatively negatively charged such that an insect simultaneously contacting both coils closes a circuit that includes the insect's body. The terminating assembly also includes a power source for producing a potential difference between the pair of coils. In one embodiment, the support is substantially cylindrical, and the coils are substantially helical on the outer surface of the support and each of the helical coils extends from a lower position to an upper position on the support.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new insect terminating pet dish which has many of the advantages of the insect terminators mentioned heretofore and many novel features that result in a new insect terminating pet dish which is not anticipated, rendered obvious, suggested, or even implied by any of the prior art insect terminators, either alone or in any combination thereof.

It is another object of the present invention to provide a new insect terminating pet dish which may be easily and efficiently manufactured and marketed.

It is a further object of the present invention to provide a new insect terminating pet dish which is of a durable and reliable construction.

An even further object of the present invention is to provide a new insect terminating pet dish which is susceptible of a low cost of manufacture with regard to both materials and labor, and which accordingly is then susceptible of low prices of sale to the consuming public, thereby making such insect terminating pet dish economically available to the buying public.

Still yet another object of the present invention is to provide a new insect terminating pet dish which provides in the apparatuses and methods of the prior art some of the advantages thereof, while simultaneously overcoming some of the disadvantages normally associated therewith.

Still another object of the present invention is to provide a new insect terminating pet dish for providing a pet food/water dish that would be resistant to insects.

Yet another object of the present invention is to provide a new insect terminating pet dish which includes a base, a bowl or rest member, and a support supporting the bowl or rest member above the base. An insect terminating assembly on the support includes at least a pair of electrically conductive coils extended about the support member in a substantially uniformly spaced relationship to each other. A first coil is relatively positively charged and a second coil is relatively negatively charged such that an insect simultaneously contacting both coils closes a circuit that includes the insect's body. The terminating assembly also includes a power source for producing a potential difference between the pair of coils. In one embodiment, the support is substantially cylindrical, and the coils are substantially helical on the outer surface of the support and each of the helical coils extends from a lower position to an upper position on the support.

Still yet another object of the present invention is to provide a new insect terminating pet dish that is easy and convenient to use.

Even still another object of the present invention is to provide a new insect terminating pet dish that keeps the food/water dish for the pet clean without insects being found in the food or water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a schematic sectional view of an optional variation of the pet food dish apparatus of FIG. 6.

FIG. 8 is a schematic sectional view of a variation of the present invention adapted for resting a conventional pet food dish (or other food container) thereon.

DESCRIPTION OF THE PREFERRED EMBODIMENT

Figure 1:
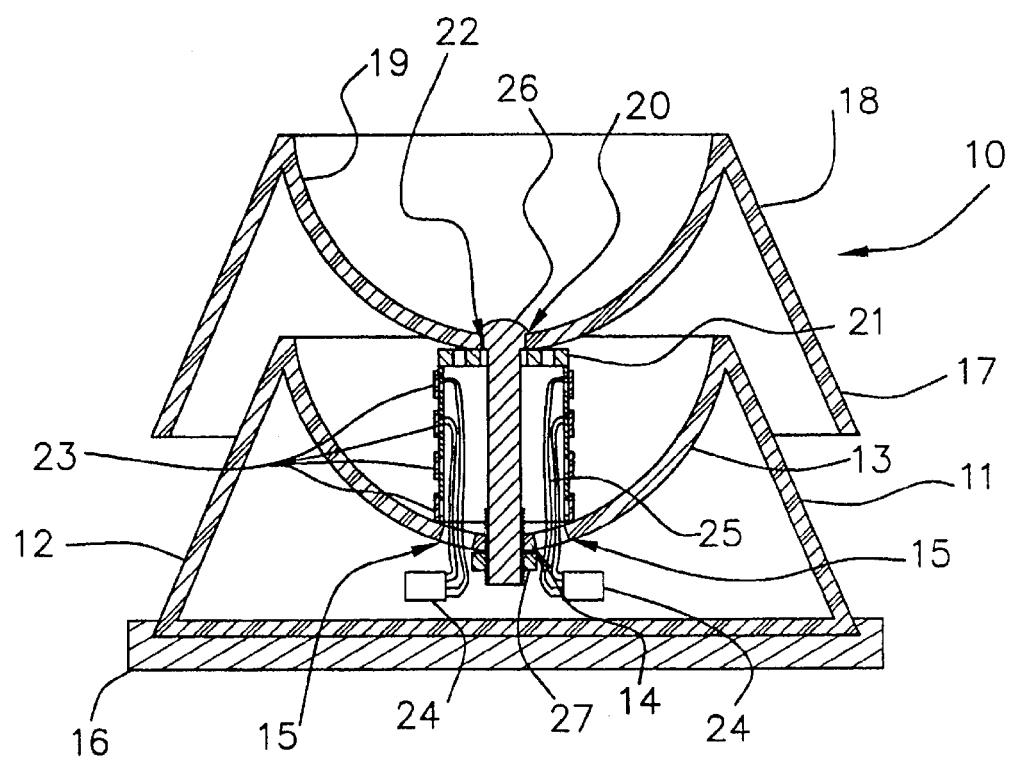
FIG. 1 is a schematic cross-sectional view of a new insect terminating pet dish according to the present invention.
Figure 2:
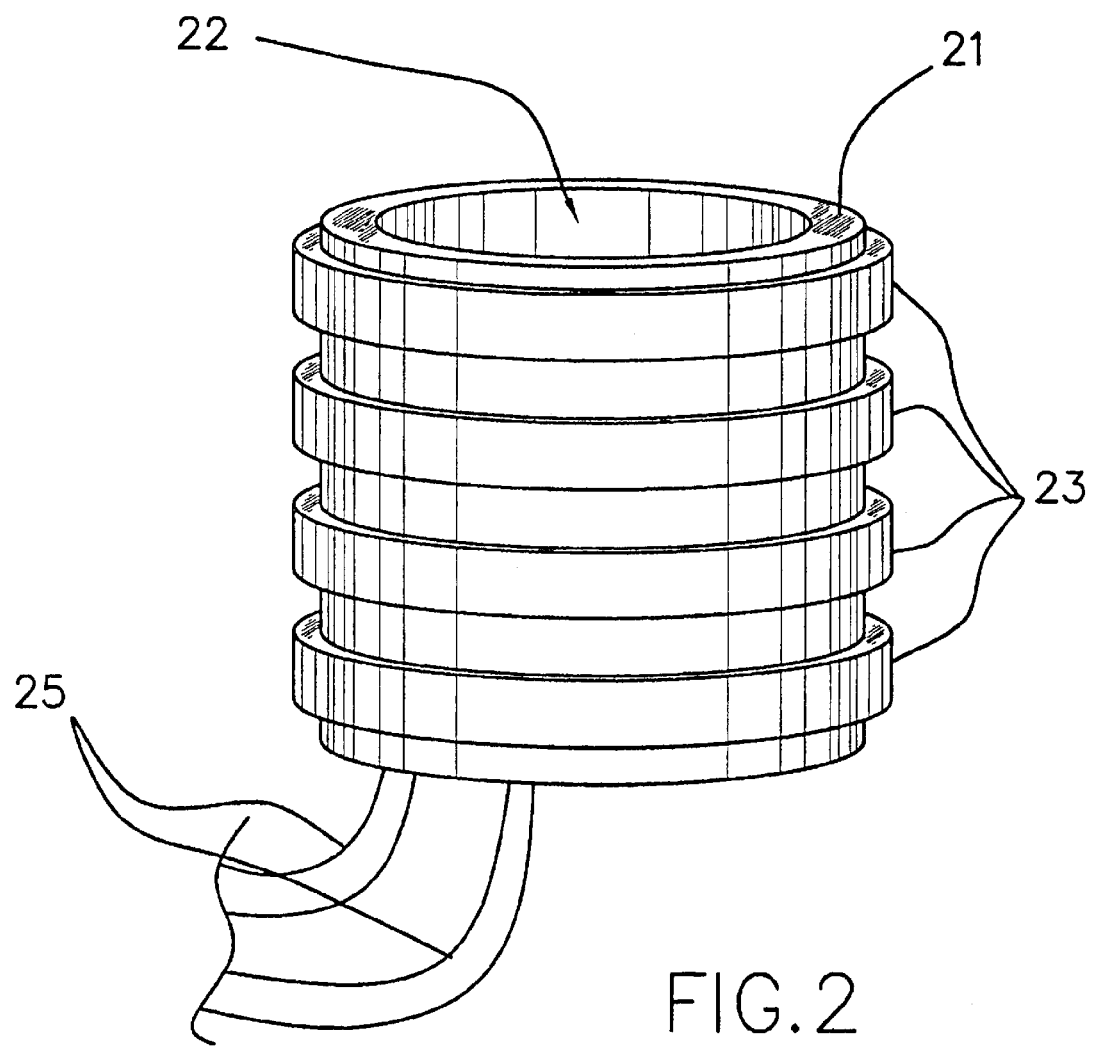
FIG. 2 is a schematic perspective view of electric coils of the present invention.
Figure 3:
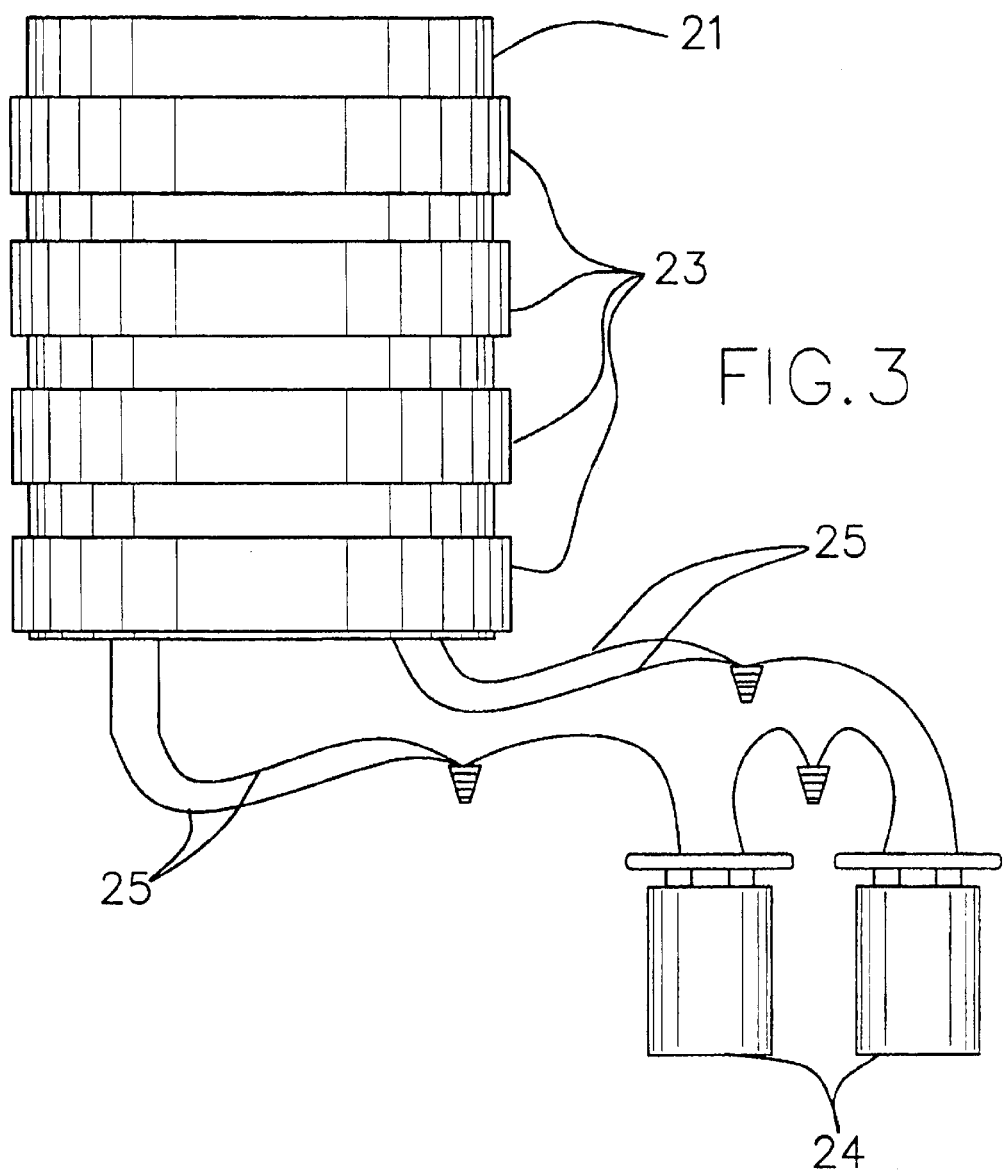
FIG. 3 is a schematic side elevational view of the electric coils and the batteries of the present invention.

With reference now to the drawings, and in particular to FIGS. 1 through 4 thereof, a new insect terminating pet dish embodying the principles and concepts of the present invention and generally designated by the reference numeral 10 will be described.

As best illustrated in FIGS. 1 through 4, the insect terminating pet dish 10 generally comprises a base assembly including a bowl-shaped base member 11 being adapted to rest upon a ground. The bowl-shaped base member 11 includes a side wall 12, and also includes a beveled top surface 13. The base assembly further includes an insulated mat 16 being disposed along a bottom of the side wall 12 for stabilizing the bowl-shaped base member 11 upon the ground. The bowl-shaped base member 11 is tapered outwardly from a top to a bottom thereof. The beveled top surface 13 has a plurality of holes 15 being disposed therethrough and includes a first hole 14 being disposed through a center of the beveled top surface 13.

A bowl member 17 is spacedly mounted above the bowl-shaped base member 11. The bowl member 17 includes a side wall 18 and a beveled top surface 19 having a hole 20 centrally disposed therethrough with the beveled top surface 19 being adapted to support food and water for a pet. The bowl member 17 is tapered outwardly from a top to a bottom thereof with the side wall 18 of the bowl member 17 spacedly and partially overlapping a top portion of the side wall 12 of the bowl-shaped base member 11.

An insect terminating assembly is conventionally attached to the bowl-shaped base member 11. The insect terminating assembly includes a tubular support member 21 having a bore 22 extending therethrough and being disposed upright upon the beveled top surface 13 of the bowl-shaped base member 11 with the bowl member 17 being mounted upon the tubular support member 21, and also includes a plurality of electrical coils 23 being wound about an exterior of the tubular support member 21, and further includes batteries 24 being disposed below the beveled top surface 13 of the bowl-shaped base member 11 and being connected with wires 25 to the electrical coils 23 for the energizing thereof, and also includes a means for fastening the bowl member 17 and the tubular support member 21 and the bowl-shaped base member 11 together. The means for fastening the bowl member 17 and the tubular support member 21 and the bowl-shaped base member 11 together includes a bolt 26 being extended through the hole 20 of the bowl member 17 and through the bore 22 of the tubular support member 21 and through the first hole 14 of the bowl-shaped base member 11, and also includes a nut 27 being threaded upon a bottom portion of the bolt 26.

Figure 4:
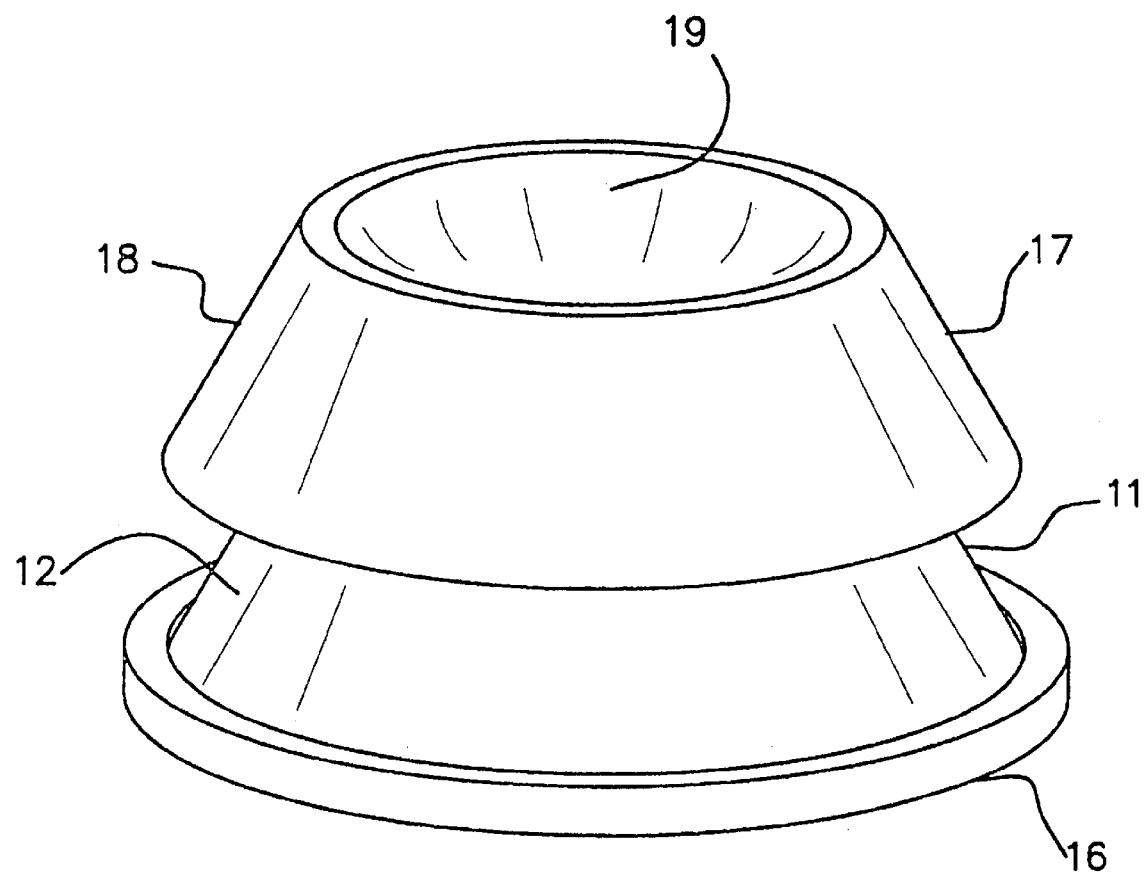
FIG. 4 is a schematic perspective view of the present invention.
Figure 5:
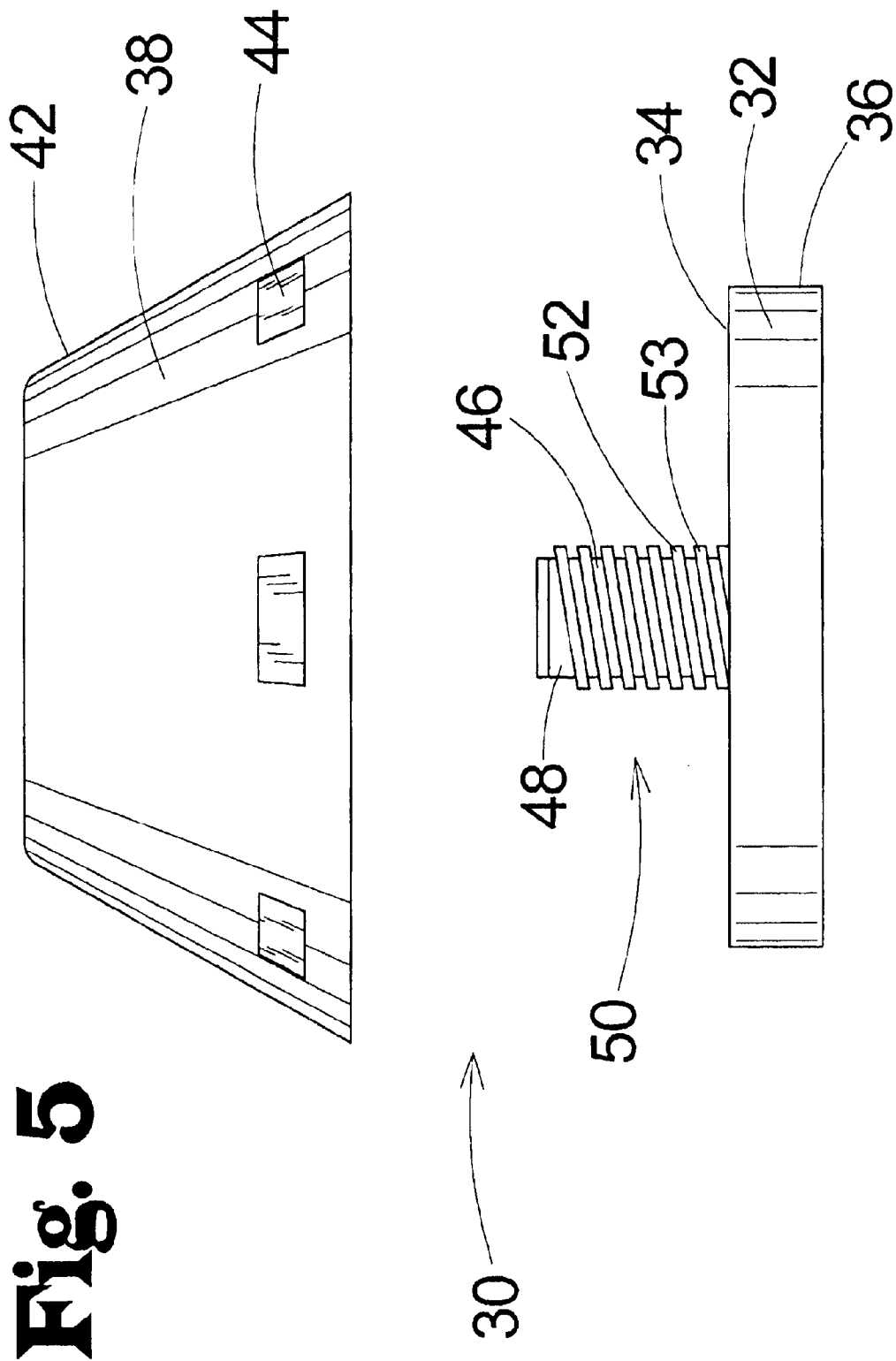
FIG. 5 is a schematic exploded front view of a pet food dish apparatus of the present invention with optional features.

Optional variations of the present invention are shown in FIGS. 5 through 8 of the drawings. In FIGS. 4 and 5, the pet food dish apparatus 30 includes a base 32 for resting upon a ground surface, and the base comprises a top wall 34 and a perimeter wall 36 extending generally downwardly from a periphery of the top wall.

The pet food dish apparatus 30 also includes a bowl 38 that is located above the base 32. The bowl 38 comprises an upper wall 40 and a side wall 42 that extends generally downwardly from a periphery of the upper wall. The upper wall 40 may have a substantially concave upper surface for holding pet food, and the side wall 42 may extend generally downwardly and outwardly from the upper wall. Optionally, at least one substantially transparent viewing window 44 may be provided on or formed in the side wall 42 of the bowl to permit viewing through the side wall into a space between the base 32 and the bowl 38. A lower perimeter edge of the side wall 42 may have a diameter that is greater than a diameter of the perimeter wall of the base 32.

The pet food dish apparatus 30 includes a support 46 extending between the base 32 and the bowl 38 to space the bowl from the base. The support 46 may extend upwardly from the base 32 to the bowl 38. The support 46 has an outer surface 48, which may be substantially cylindrical in shape. In one embodiment of the invention, the support 46 may have a height that positions a lower edge of the side wall 42 of the bowl 38 at a lower vertical level than the top wall 34 of the base 32. The support 46 may be removably mounted on the bowl 38, as is shown in the embodiment illustrated in FIGS. 5 and 6, or the support may be removably mounted on the base 32, as is illustrated in the embodiment shown in FIG. 7. The removability of the support from either of the base or the bowl permits access to the space therebetween for cleaning of dead insects from this space, power source replacement if the power source is located in this area, or other types of maintenance.

The pet food dish apparatus 30 also includes an insect terminating assembly 50 for electrically exterminating insects. The insect terminating assembly may include at least a pair of electrically conductive coils 52, 53 that extend about the support 46 in a substantially uniformly spaced relationship to each other. The pair of coils 52, 53 may be substantially helical in shape and may be mounted on and about the support 46. A first coil 52 of the pair of coils may be relatively positively charged and a second coil 53 of the pair of coils may be relatively negatively charged such that an insect simultaneously contacting both the first and second coils closes a circuit that includes the body of the insect, thus shocking and killing the insect at sufficient voltage levels.

The insect terminating assembly may also include a power source 56 for producing a charge on each of the pair of coils. The power source 56 may be electrically connected to each coil of the pair of coils, and a positive terminal of the power source may be connected to the first one of the pair of coils and a negative terminal of the power source may be connected to the second one of the pair of coils. The power source 56 should produce a voltage difference between the first and second coils that is suitable to kill, or at least stun, small insects that will attempt to climb the structure of the invention to reach the pet food. In one embodiment of the invention, a voltage difference of approximately 18 volts has been found to be highly suitable. The power source preferably comprises a battery, although a cord may be provided that connects the pair of coils to a more permanent power source such as an electrical outlet. However, utilizing a cord would limit the available places that the apparatus may be used to those relatively close to an electrical outlet. In one illustrative embodiment of the invention, a pair of nine volt batteries is connected in series to produce a voltage differential of approximately 18 volts.

Significantly, current flows through the circuit of the insect terminating assembly (i.e., the power source 56 and the pair of coils 52, 53) only when the circuit is closed, and the circuit is only closed when the body of an insect contacts both the first and second coils simultaneously. This characteristic of the invention minimizes the draining of power from the power source, and thus increases the intervals over which the power source, or battery, will remain effective.

The power source may be positioned in an interior of the base (see FIG. 6) or in the space between the base and the bowl (see FIG. 7). Significantly, the positioning of the coils and the power source between the base and bowl can provide an extra measure of safety as the possibility of pets licking the coils or the power source is greatly reduced, as well as limiting access of a child to the coils and the power source and reducing the chance of the coils or power source being exposed to moisture in the form of rain, dew, gravy or other sauces associated with the pet food. The positioning of the coils and power source between the base and the bowl also may reduce the possibility that environmental factors such as sunshine (and the resulting heat) and dust may affect the operation of the coils and power source. It should also be noted that the detachability of the bowl from the support, the base, and the insect terminating assembly permits the bowl to be removed and washed with water, such as in a dishwasher, without harming the insect terminating assembly.

Figure 6:
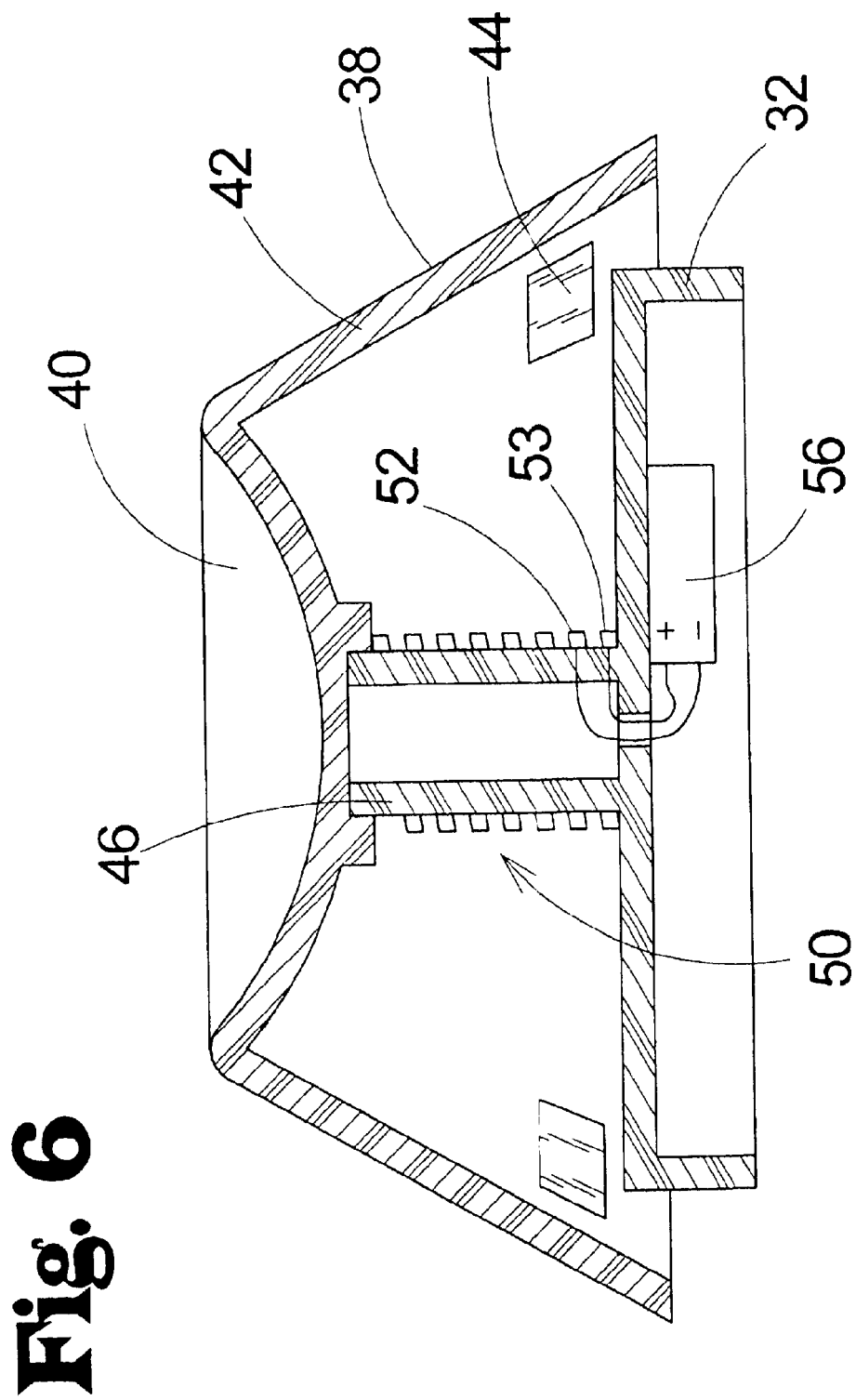
FIG. 6 is a schematic sectional view of the pet food dish of FIG. 5.

Further, while the connection between the support 46 and the bowl 38 illustrated in FIGS. 6 and 7 generally shows a snug or interference fit between the connecting portions of these parts, other forms of connection that are even more secure may be employed. For example, the upper end of the support and the portion of the bowl that is removably engaged to the support may be cooperatively threaded to permit these parts to be removably attached together. As a further example, the upper portion of the support and the mating portion of the bowl may be configured similar to the structures employed to mount a so-called "childproof" cap on a medicine bottle in a manner that is conventional to the art of medicine bottles but otherwise unknown to the pet food dish art.

Another optional variation of the invention, shown in FIG. 8 of the drawings, may be characterized as an insect terminating pet food dish supporting apparatus 60 that includes a base 62 for resting upon a ground surface and a rest member 64 located above the base. The rest member 64 may include an upper wall 66 and a side wall 68 that extends generally downwardly from the upper wall 66. The upper wall 66 of the rest member may have a substantially planar upper surface 67 for resting a pet food dish thereon. The supporting apparatus 60 may also include a support 70 that extends between the base 62 and the rest member 64 to space the rest member from the base. The support apparatus 60 may also include an insect terminating assembly 72 of similar configuration to the insect terminating assembly 50 described above, and thus providing the user with the option to use a specialized or favorite food dish with the insect terminating assembly of the invention.

In use, the user places the insect terminating pet dish apparatus upon a ground or floor surface and connects the power source to the electrical coils to energize the coils such that the electrical coils terminate or stun insects as they contact a pair of the coils as they attempt to walk up the outer surface of the support between the base and the bowl, or the rest member.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction ane operation shown and described, and accordingly, all suitable modifications and equivalents may be resorted to, falling within the scope of the invention.

I claim:

1. An insect terminating pet food dish apparatus comprising:
   a base for resting upon a ground surface;
   a bowl located above said base, said bowl including an upper wall and a side wall extending generally downwardly from a periphery of said upper wall, said upper wall having a substantially concave upper surface for holding pet food;
   a support extending between said base and said bowl to space said bowl from said base, said support extending upwardly from said base to said bowl, said support having an outer surface; and
   an insect terminating assembly for electrically exterminating insects, said insect terminating assembly including:
      at least a pair of electrically conductive coils extended about said support member in a substantially uniformly spaced relationship to each other, a first coil of said pair of coils being relatively positively charged and a second coil of said pair of coils being relatively negatively charged such that an insect simultaneously contacting both the first and second coils closes a circuit including the body of the insect; and
      a power source for producing a charge on each of said pair of coils, said power source being electrically connected to each of said pair of coils, a positive terminal of said power source being connected to the first one of said pair of coils and a negative terminal of said power source being connected to the second one of said pair of coils;
      wherein said pair of coils are substantially helical on said outer surface of said support and each of said helical coils extends from a lower position on said support to an upper position on said support.

2. The apparatus of claim 1 wherein said outer surface of said support is substantially cylindrical.

3. The apparatus of claim 1 wherein a circuit including said power source and said pair of coils is closed only when the body of an insect contacts both said first and second coils for minimizing draining of power from said power source.

4. The apparatus of claim 1 wherein said power source and said coils are positioned between said base and said bowl, said side wall of said bowl extending to a vertical level below a top wall of said base to define a slot between said base and said bowl for restricting access of a child to said pair of coils and said power source between said base and said bowl.

5. The apparatus of claim 1 wherein said power source produces a voltage difference between said first and second coils of approximately 18 volts.

6. The apparatus of claim 1 wherein said power source comprises a removable battery.

7. The apparatus of claim 1 wherein said support is removably mounted on said base to permit removal of said support and said bowl from said base.

8. The apparatus of claim 1 wherein said base includes a top wall and a perimeter wall extending generally downwardly from a periphery of said top wall;
   said side wall of said bowl extending generally downwardly and outwardly from said upper wall, a lower perimeter edge of said side wall having a diameter greater than a diameter of said perimeter wall of said base;
   said support having an outer surface, said outer surface of said support being substantially cylindrical, said support having a height positioning a lower edge of said side wall of said bowl at a lower vertical level than said top wall of said base, said support being removably mounted on said base to permit removal of said support and said bowl from said base;
   said power source producing a voltage difference between said first and second coils of approximately 18 volts, said power source comprising a battery; and
   wherein a circuit including said power source and said pair of coils is closed only when the body of an insect contacts both said first and second coils for minimizing draining of power from said power source.

9. The apparatus of claim 1 wherein a diameter of said outer surface of said support is substantially smaller than a diameter of an outer surface of said side wall of said bowl.

10. The apparatus of claim 1 wherein said outer surface of said support is substantially cylindrical;
    wherein a circuit including said power source and said pair of coils is closed only when the body of an insect contacts both said first and second coils for minimizing draining of power from said power source;
    wherein said power source and said coils are positioned between said base and said bowl, said side wall of said bowl extending to a vertical level below a top wall of said base to define a slot between said base and said bowl for restricting access of a child to said pair of coils and said power source between said base and said bowl;
    wherein said power source produces a voltage difference between said first and second coils of approximately 18 volts;
    wherein said power source comprises a removable battery; and
    wherein said support is removably mounted on said base to permit removal of said support and said bowl from said base.

11. The apparatus of claim 10 wherein said base includes a top wall and a perimeter wall extending generally downwardly from a periphery of said top wall;
    said side wall of said bowl extending generally downwardly and outwardly from said upper wall, a lower perimeter edge of said side wall having a diameter greater than a diameter of said perimeter wall of said base; and
    said support having an outer surface, said outer surface of said support being substantially cylindrical said support having a height positioning a lower edge of said side wall of said bowl at a lower vertical level than said top wall of said base, said support being removably mounted on said base to permit removal of said support and said bowl from said base.

12. The apparatus of claim 10 wherein a diameter of said outer surface of said support is substantially smaller than a diameter of an outer surface of said side wall of said bowl.

* * * * *